United States Patent [19]
Taplin et al.

[11] 3,789,816
[45] Feb. 5, 1974

[54] LEAN LIMIT INTERNAL COMBUSTION ENGINE ROUGHNESS CONTROL SYSTEM

[75] Inventors: Lael B. Taplin, Livonia; William R. Seitz; Chun Keung Leung, both of Farmington, all of Mich.

[73] Assignee: The Bendix Corporation, Southfield, Mich.

[22] Filed: Mar. 29, 1973

[21] Appl. No.: 346,240

[52] U.S. Cl. 123/119 R, 123/32 AE, 123/32 EA, 123/102, 123/106, 123/139 AW, 123/198 R
[51] Int. Cl. F02d 5/00, F02m 51/00, F02m 57/00
[58] Field of Search 123/119 R, 139 AW, 198 R, 123/102, 106, 32 AE, 32 EA; 60/39.09

[56] References Cited
UNITED STATES PATENTS

| | | | |
|---|---|---|---|
| 2,670,724 | 3/1954 | Reggio | 60/DIG. 6 |
| 2,842,108 | 7/1958 | Sanders | 123/102 |
| 2,911,966 | 11/1959 | Pribble | 123/119 R |
| 2,982,276 | 5/1961 | Zechnall et al. | 123/32 EA X |
| 2,992,640 | 7/1961 | Knapp | 123/119 R |
| 3,154,060 | 10/1964 | Hundere | 123/119 R |
| 3,338,221 | 8/1967 | Scholl | 123/119 R X |
| 3,483,851 | 12/1969 | Reichardt | 123/119 R |

*Primary Examiner*—Wendell E. Burns
*Assistant Examiner*—Tony Argenbright
*Attorney, Agent, or Firm*—Gerald K. Flagg

[57] ABSTRACT

A closed loop fuel control mechanism for controlling the air fuel mixture delivered to an internal combustion engine so as to regulate the roughness of the engine at a predetermined level. The control system receives as input signal a signal indicative of the engine roughness and processes this signal to generate an output control signal for controlling the fuel delivery mechanism of the internal combustion engine to operate that engine at the leanest possible air/fuel mixture ratio compatible with a predetermined level of engine roughness.

15 Claims, 5 Drawing Figures

LEAN LIMIT INTERNAL COMBUSTION ENGINE ROUGHNESS CONTROL SYSTEM

The present invention relates to closed loop engine controls in general and in particular to closed loop engine controls of the type that control the air fuel mixture delivered to an internal combustion engine so as to regulate engine roughness at an acceptable level.

Closed loop control systems for controlling a parameter of an internal combustion engine are well known in the art. For example the Pat. to Draper and Lee No. 2,628,606 and, the paper "Principles of Optimizing Control Systems and An Application to the Internal Combustion Engine," by C. S. Draper and Y. P. Li, published Sept. 1951 by the American Society of Mechanical Engineers both disclosed the use of a closed loop control system, also known as an extremum or optimizing system, for oscillating the air and/or fuel flow to an internal combustion engine. Using the effects of such dithering the optimizing system controls the engine so as to seek out and operate at its optimum power or most economical fuel consumption point in spite of any reasonable change of output level or environmental operating conditions. Such optimizing systems, moreover, inherently effect some reduction in the formation of certain exhaust gas constituents since the air/fuel mixture producing the optimum power is on the lean side of the stoichiometric air/fuel ratio and since increasing leanness is known to reduce the formation of such constituents as carbon monoxide, hydrocarbons, and to some degree nitrous oxides.

However, the power optimization technique has not been incorporated in mass produced internal combustion engines and therefore the reduction in formation of certain emissions that might have been realized thereby has heretofore not been obtained. Moreover such commercial adoption of the technique would be hindered by a combination of factors including the following. The primary factor is that such optimizing systems are not only effectual at idle and wide open throttle, two entirely normal modes of operation where formation of emissions must nevertheless be controlled, but also must be cut out or disconnected when the leanness of the air/fuel mixture causes the engine to start to misfire. Another factor is that this technique does not control the power output directly, nor for that matter does the technique require even the measurement of the magnitude of the power output. Instead, momentary power changes are effected only indirectly and then through a time-and-phase lag susceptible system. Thus, after dithering a power-affecting parameter only the positive or negative sense and not the magnitude of the resulting power change is determined. As another factor affecting its adoption, the optimizing technique requires the dithering of parameters that might otherwise not be dithered and thereby introduces undesirable performance consequences related to just such dithering. A further factor is that the technique requires the generation, synchronization, and comparison of the dithered parameter with its effects and therefore incurs not only the cost and serviceability penalties associated with the extra equipment but also the effects of errors inherent in the equipment. Moreover these steps are subject to phase and time delay errors between the initiation and the effects of the dithering, such delays being dependent on speed of the engine and being further subject to the errors in the detection thereof.

Moreover, even if the theoretical benefits of the use of optimization technique for effecting some reduction in the formation of emissions could be realized commercially, the power optimization technique actually prevents operating the engine as lean as possible so as to reduce emissions as much as possible. In view of the aforementioned operational limit imposed by the occurrence of occasional misfires, the power is maximized at an air/fuel ratio which is substantially richer than the leanest of air/fuel ratio at which the engine could be operated before the resulting leanness induced engine roughness causes vehicle driveability to become unacceptable.

Not only has this relationship between the leanness of the air/fuel mixture and engine roughness long been known but also the contribution to unacceptable driveability due to operation of the engine at its lean limit has been measured, for example, by measuring cylinder pressure variations or by measuring fore and aft linear motion of the vehicle body, the latter measurements being described in the paper "Measuring Vehicle Driveability" by R. L. Everett, published as Paper No. 710137 for the Jan. 11–15, 1971 Conference of the Society of Automotive Engineers. The knowledge of the effect of leanness on vehicle driveability and the means for measuring it not withstanding, the magnitude of vehicle driveability has heretofore not been controlled as the controlled parameter of a closed loop engine control system. Moreover, rather than attempting to continuously and always maintain engine operation right at the leanest air/fuel ratio possible, the prior art systems have used this limit only to disable themselves or effect engine operation at a safe margin from it.

It is desirable to be able to continuously control the formation of certain undesirable engine emissions during all modes of engine operation and not during just certain modes and not during other normal operating modes. It is also desirable to control the formation of undesirable exhaust gas constituents in a more direct and less circuitous manner than with the power optimization technique and without incurring the equipment, error, and emission penalties associated therewith. It is also desirable to avoid the steps of generating, synchronizing, and comparing dither effects required by the power optimization technique by controlling the magnitude and not the sense of a parameter related to engine performance. It is also desirable to control the formation of certain exhaust gas constituents by controlling a clearly measurable parameter, the magnitude of which not only indicates actual engine performance and yet is also adjustable to permit trade-off between vehicle driveability and emission control.

It is therefore a prominent object of the present invention to provide a new and improved closed loop control system for reducing the formation of certain exhaust gas constituents of an internal combustion engine.

It is another primary object of the present invention to provide a closed loop control system for regulating engine roughness.

It is a further object of the present invention to provide a closed loop air/fuel control system responsive to the magnitude of engine roughness so as to maintain as lean an air fuel mixture as possible without exceeding a predetermined level of roughness.

It is another primary object of the present invention to provide a closed loop control system for controlling the leanness of the air/fuel mixture delivered to an internal combustion engine so as to regulate engine operation at the threshold of unacceptable engine roughness.

It is a further object of the present invention to provide a closed loop control system for sensing and regulating the magnitude of engine roughness. And it is another object of the present invention to provide a closed loop engine control system of the foregoing type wherein the magnitude of engine roughness is determined by sensing and differentiating the speed changes of a rotatable engine member.

Furthermore, recognizing that the magnitude of engine roughness affects vehicle driveability oppositely from the leanness-influenced formation of certain exhaust emissions, the present invention as another of its objects provides a closed loop control system for controlling engine roughness at a magnitude which is selected to effect a trade-off between vehicle driveability and the formation of such emissions.

As is also known, for the purposes of both vehicle performance and emissions control, to deliver the desired quantity of fuel to the engine during certain modes of engine operation including certain driver commanded engine performance changes requires that the fuel control schedule be changed from that effected during steady state operation. It is therefore another object of the present invention to provide a closed loop fuel control system that normally maintains as lean as air fuel as possible so as to just follow the threshold of unacceptable engine roughness during steady state operation and that permits a different control of air fuel ratio to be effected in the presence of other modes of operation.

Furthermore, recognizing that certain driver commanded performance changes contribute low frequency components of engine roughness, the present invention as another object provides a closed loop engine control system that includes low frequency responsive apparatus for modifying the normal operation of the control system in accordance with low frequency components of engine roughness. It is another object of the present invention to provide a closed loop engine control system of the foregoing type for normally maintaining the air fuel mixture as lean as possible so as to normally maintain the magnitude of engine roughness below a first predetermined level, the low frequency responsive apparatus preventing such normal operation of the control system when the magnitude of the low frequency components of engine roughness exceed a second predetermined level.

In accordance with the control system of the present invention, a tachometer suitably coupled to a crankshaft driven member of an internal combustion engine senses the high frequency speed changes thereof resulting from lean air fuel mixtures as well as low frequency speed changes resulting from driver commanded engine performance changes. The speed signal developed by the tachometer is attenuated by a filter to pass only the frequencies of interest and is then differentiated by a differentiator to provide a raw roughness signal varying with a derivative of the speed signal. This raw roughness signal is full wave rectified by a full wave rectifier and is thereafter compared by a comparator with a roughness threshold reference, the magnitude of which is selected to correspond with a level of acceptable vehicle driveability. The output of the comparator is applied to an integrator which produces an increasing output when the engine roughness is below the acceptable driveability level and a decreasing output when the roughness is above this level. The output of the integrator causes an electronic fuel injection system to vary the duration of the fuel injection period so as to increase the leanness of the air fuel mixture as long as the engine roughness is below the acceptable level and to decrease the leanness when the roughness momentarily exceeds this level, the net effect of such leanness control being to regulate the roughness at this level.

These and other objects and features of the present invention will become more apparent from the following description taken in conjunction with the following Figures wherein.

Figure 1:
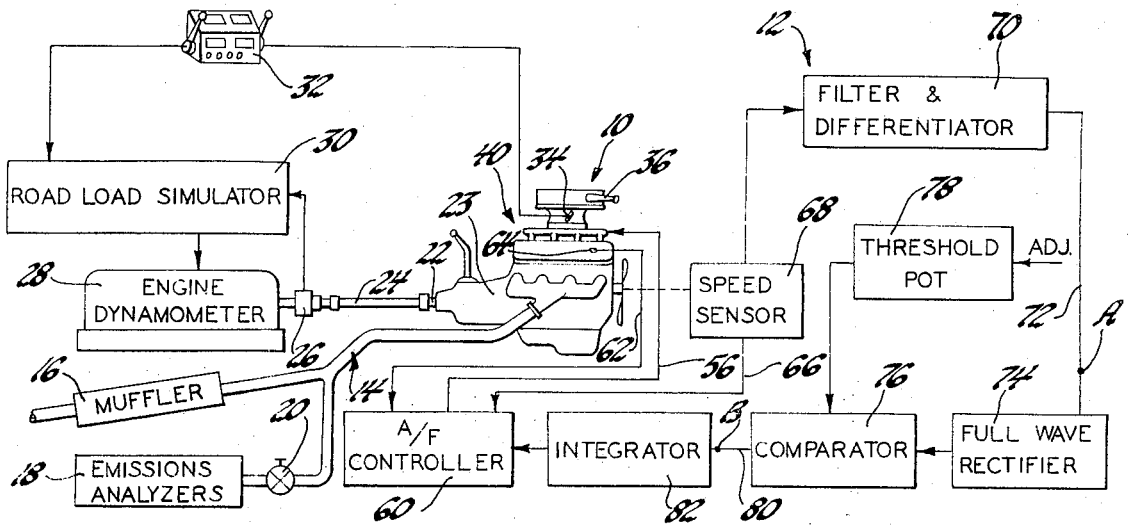
FIG. 1 is an illustration partially in block diagram and partially in schematic of a closed loop internal combustion engine control system for controlling the air/fuel ratio so as to regulate the roughness of engine operation.

With reference now to FIG. 1, there is shown an intermittently firing spark ignition internal combustion engine 10 which is conventional except that air and fuel are delivered thereto in a ratio controllable by a closed loop control system 12 so as to regulate the roughness of engine operation. In the presently preferred embodiment, control system 12 is operative to reduce the percentage of concentration of certain exhaust gas constituents in the combustion products of the engine 10 by biasing the air/fuel ratio towards an engine performance related "lean limit' as long as engine roughness is below a predetermined magnitude and, when the roughness just exceeds the predetermined magnitude, to decrease the air/fuel ratio to decrease the roughness. In view of this presently preferred embodiment, control system 12 is hereinafter termed "lean limit loop 12" and is shown in a laboratory emission testing environment.

Thus, as illustrated in FIG. 1 a branch of the engine exhaust system 14 of the engine 10 upstream of the muffler 16 thereof is shown connected to emission analyzing apparatus 18 through a valve 20, and the output shaft 22 of the engine transmission 23 is shown connected by a shaft 24 and a torque cell 26 to an engine dynamometer 28. Engine dynamometer 28 is responsive to commands provided by a suitable road load simulator 30 such as a computer responsive to torque signals provided by torque cell 26 and brake signals provided by a driver control 32. Driver control 32 is connected electrically and/or mechanically to control a suitable air consumption control device 34 in the form of throttle plates (not shown) mounted on a throttle shaft in the engine air induction passage intermediate an air intake end 36 thereof and an engine outlet end thereof.

Figure 2:
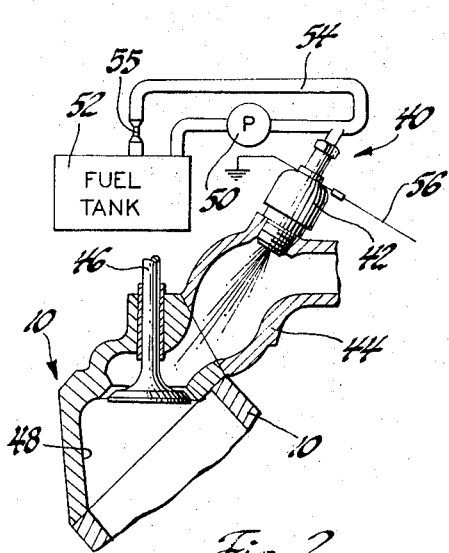
FIG. 2 is a view partially in schematic and partially in cross-section of a fragmentary portion of fuel delivery apparatus of the closed loop internal combustion engine control system of FIG. 1.

Engine 10 further comprises fuel delivery means 40 operable to control the delivery of fuel flow so as to maintain a desired relationship to the air flow. As may be better understood in conjunction with FIG. 2, fuel delivery means 40 in the presently preferred embodiment comprises an electronically controlled fuel injection system including an electromagnetically operated fuel injector valve 42 mounted in the engine intake manifold 44 upstream therein of an engine intake valve 46 (shown open) and operative to control the injection of fuel therethrough into an engine combustion chamber 48, a pump 50 being provided to pump the fuel to injector valve 42 from a suitable fuel supply 52 through a fuel rail and return conduit 54 having a flow restriction 55 therein.

The injector valve 42 is electrically connected by a conductor 56 to a fuel delivery controller 60, hereinafter termed "air fuel controller," of the type known in the art for controlling the length of the fuel injection period by using one or more engine dependent parameters to either vary the point at which such injection period commences and/or to vary the point at which such injection period terminates. Air fuel controller 60 in the presently preferred embodiment comprises a suitable pulse train generating device which may be of a type disclosed in commonly assigned and co-pending U.S. Pat. application Ser. No. 101,896 filed on Dec. 28, 1970 issued as Pat. 3,734,068 on May 22, 1973 in the name of Junuthula N. Reddy and entitled "Fuel Injection Control System," hereby expressly incorporated herein by reference.

As described in further detail the indicated Reddy application, fuel delivery controller 60 generates a pulse train of specially shaped voltage vs. time signals, each pulse having a specially shaped beginning portion for determining the commencement of each injection period in accordance with engine speed and a constant-sloped ramp portion for terminating each injection pulse when the ramp portion intercepts a predetermined reference level related to air flow. To receive such air-flow and speed-dependent intelligence, the air fuel controller 60 is connected by a conductor 62 to a sensor 64 for sensing the air flow or a parameter related thereto such as the manifold air pressure and is also connected by a conductor 66 to a speed sensor 68, speed sensor 68 in the presently preferred embodiment comprising a 60 toothed tachometer wheel suitably coupled to a suitable crankshaft driven member (not shown) of engine 10, such as a flywheel, ring gear, or pulley thereof. Using the engine speed and air flow intelligence thus provided, air fuel controller 60 operates to modify the duration of the pulse injection period so as to maintain a desired relationship between the air flow and the fuel flow, such desired relationship varying from an air fuel ratio as low as 9 to 1 during cold engine starting conditions to slightly above the stoichiometric ratio of about 14.8 to 1 on completion of engine warm up.

In accordance with the present invention the lean limit loop 12 generates and applies to air fuel controller 60 an air/fuel ratio change command that normally decreases the fuel injection period so as to increase the air/fuel ratio until such ratio is biased to a limit so lean that the engine just begins to run rough. The lean limit loop 12 responds to this incipient roughness by momentarily decreasing the air/fuel change command and thereby enriching the air/fuel ratio, such change command increasing the fuel injection period by causing the ramp of the controller generated pulse train to intercept the reference voltage later, as might be effected either by decreasing the slope of the ramp portion and/or by raising the reference voltage.

To thus continuously control the air/fuel ratio to in effect maintain it at its lean limit, lean limit loop 12 detects an engine parameter varying with the air/fuel ratio and then momentarily modifies the air/fuel ratio so as to control the engine parameter. One such parameter is engine speed since, as the air fuel mixture momentarily becomes too lean or too rich relative to the stoichiometric ratio, the power generated by different cylinders of the engine momentarily becomes uneven or rough, thereby causing the torque delivered by the piston to the engine crankshaft to be correspondingly uneven or rough and thereby causing the crankshaft to momentarily accelerate or decelerate in accordance with the uneven torque. Terming generically as "engine roughness" all such momentary power differences, torque changes, accelerations and decelerations, or the speed changes, the lean limit loop 12 of the present invention provide apparatus operative to detect such roughness and to modify the air/fuel ratio so as to maintain the roughness below a predetermined magnitude.

A roughness sensor suitable for use by the lean limit loop 12 is of a type described in greater detail in a copending and commonly assigned U.S. Pat. application Ser. No. 249,440 filed on Apr. 24, 1972, in the name of Taplin et al. and entitled "Surge Sensory Apparatus For A Prime Mover," such application being hereby expressly incorporated herein by reference. Briefly, such roughness sensor comprises a filter and differentiator 70 that receives a speed signal from the tachometer 68, attenuates frequencies outside a desired band of frequencies and differentiates the remaining non-attenuated speed signal to generate a derivative signal varying with at least the first derivative of the speed signal. To permit the beneficial use of both the acceleration information and the deceleration information contained in this derivative signal and also to condition this derivative signal for comparison with a roughness reference signal, the output of the differentiator is applied by a conductor 72 to a full wave rectifier 74 and therefrom to a comparator 76. A suitable source of adjustable reference voltage in the form of a potentiometer 78 is connected to comparator 76 to provide a roughness threshold reference thereto. Comparator 76, in the presently preferred embodiment, produces a comparison signal of one polarity when the rectified roughness signal is less than the roughness threshold reference and of the opposite polarity when the rectified roughness signal is greater than the roughness threshold reference, such comparison signals being communicated by a comparison signal conductor 80 to an integrator 82. Integrator 82 generates an A/F change command applied to air/fuel controller 60 causing the controller to either continually shorten the period of the fuel injection pulse and thereby increase the air/fuel ratio towards a lean limit as long as the output of comparator 76 is of the first polarity or to otherwise increase the period of the injection pulse to decrease the air/fuel ratio away from its lean limit as long as the output of comparator 76 is of the other polarity.

The magnitude of the threshold reference provided by potentiometer 78 is selected to correspond with a level of engine roughness at which the air/fuel mixture is made as lean as possible to the point that the formation of such exhaust gas constituents as HC and CO is minimized without the driveability of the particular vehicle being unacceptable. To effect this trade-off between vehicle driveability and emission control the setting of the roughness threshold may vary from one engine application to another. For example, the roughness threshold may be set to tolerate engine speed changes as high as 12 r.p.m., as might be set for engines driving hydraulically-coupled transmissions that hydraulically attenuate some of the roughness, or substantially lower speed changes, as might be set for engines driving clutch-coupled transmission that transmit the engine roughness relatively unattenuated, the former setting normally producing fewer emissions under comparable operating conditions than the latter.

Figure 3:
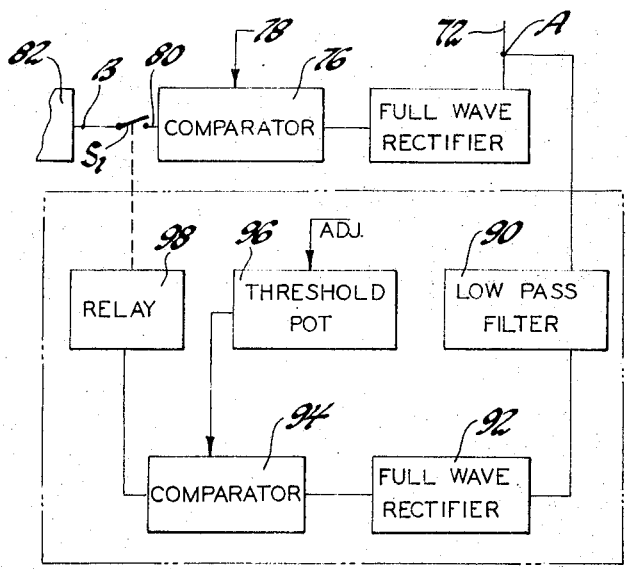
FIG. 3 is a block diagram representation of a portion of the closed loop internal combustion engine control system of FIG. 1 modified by a sub-loop for modifying the control of the leanness of the air/fuel ratio in the presence of certain driver commanded performance changes.

As may be better understood with the reference to FIG. 3, a lean limit modification sub-loop in the form of a cut-out loop 84 is provided should it be desirable to modify the operation of limit loop 12 during certain conditions or modes of engine operation as, for example, to inhibit the fuel enrichment that would otherwise result from low frequency engine accelerations and decelerations associated with driver commanded changes in vehicle performance. Such low frequency roughness signals while they are attenuated with respect to the roughness signals passed unattenuated by filter and differentiator 70 to full wave rectifier 74 nevertheless could still be of sufficient magnitude when differentiated and rectified to cause the rectified output of rectifier 74 to exceed the roughness threshold. While in some applications of the lean limit loop 12 it may be desirable to use this extra component of roughness information to enrich the air/fuel ratio during acceleration or conversely to lean out the mixture during deceleration, in the presently preferred embodiment it is desired to control the leanness of air/fuel mixture in accordance with just the roughness caused by the leanness of the mixture and not by components of roughness induced by driver commanded accelerations or decelerations.

To effect such inhibiting of the operation of lean limit loop 12 under these circumstances, cut-out loop 84 is connected in parallel around the full wave rectifier 74 and comparator 76 of lean limit loop 12 at points designated A and B on conductors 72 and 80 thereof. Cut-out loop 84 comprises a low pass filter 90 connected in series with a full wave rectifier 92, a comparator 94, a relay 98 and a switch S1, switch S1 being inserted between comparator 76 and integrator 82 of the main lean limit loop 12. Low pass filter 90 attentuates higher frequency components of the roughness signal previously passed unattenuated by filter and differentiator 70 and passes without further attenuation the previously attenuated low frequency components of the roughness signal to full wave rectifier 92. Comparator 94 compares the rectified low frequency roughness signal provided by rectifier 92 with the low frequency roughness threshold signal provided by an adjustable source of reference voltage 96, the magnitude of which is selected so as to permit cut-out loop 84 to modify the operation of main loop 12 only in the presence of more than nominal driver commanded performance changes. When the magnitudes of such performance changes are more than nominal, comparator 94 provides command signal to relay 98 causing switch S1 to open the connection between comparator 76 and integrator 82 thereby inhibiting the normal operation lean limit loop until the effects of such more than nominal changes have subsided.

Figure 4:
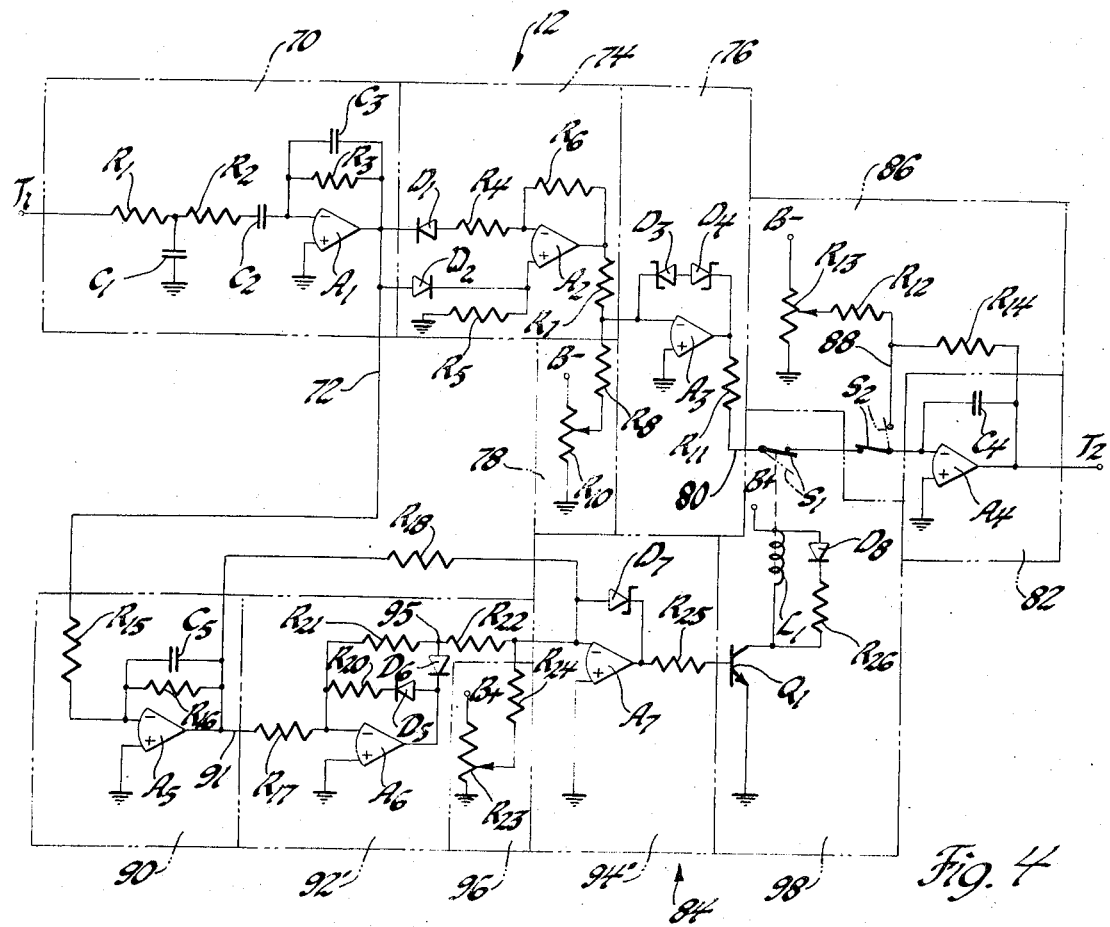
FIG. 4 is an electrical schematic of the closed loop internal combustion engine control system of FIG. 1 as modified by a sub-loop similar to that shown in FIG. 3.

As may be better understood with reference to FIG. 4, filter and differentiator 70 comprises three filter stages comprising resistor-capacitor combinations R1–C1, R2–C2, and R3–C3, in combination with a differentiator comprising operational amplifier A1, feedback resistor R3, and capacitor C2. As described in greater detail in the above-referenced Taplin et al. U.S. Pat. application Ser. No. 249,440, the three filter stages have a common frequency break at about 20 radians per second on the log gain vs. log frequency plot and each such stage constitutes a lag type network having a transfer function characterized by $1/(\tau s + 1)$. Moreover, the differentiator has a lead type transfer function characterized by $\tau s$ so that the signal on conductor 72 at the output of amplifier A1 varies with the first derivative, in this case the acceleration or deceleration, of the speed signal applied through differentiator input terminal T1.

Full wave rectifier 74 comprises an operational amplifier A2 having inverting and noninverting input terminals respectively connected through oppositely polled rectifier diodes D1 and D2 to the output of differentiator 70. With the anode of diode D1 connected through a resistor R4 to the inverting input terminal of amplifier A2, only negative signals are communicated thereto to produce only positive signals at the output thereof. Similarly, with the cathode of diode D2 referenced to ground through resistor R5 and connected to the noninverting input terminal of amplifier A2, only positive signals are communicated thereto to also produce just positive signals at the output thereof.

Threshold comparator 76 comprises an operational amplifier A3, the inverting input terminal of which is connected to both the output of rectifier amplifier A2 through resistor R7 and to the output terminal of amplifier A3 through a pair of series-connected oppositely-polled Zener diodes D3 and D4. A roughness threshold reference voltage is provided by an adjustable potentiometer 78, the fixed element R10 of which is connected between a suitable negative supply and ground and the wiper arm of which is connected to the inverting input terminal of A3 through resistor R8. The noninverting input terminal of amplifier A3 is ground so that a slightly negative voltage is provided at the inverting input terminal when the output of a full wave rectifier 74 is less than the reference voltage provided by the potentiometer. With this slightly negative input to the inverting input terminal of amplifier A3, the output thereof on conductor 80 is a positive value determined by the breakdown voltage of Zener D4. As the output of full wave rectifier 74 increases to exceed the output provided by the threshold reference 78, the voltage at the inverting input terminal of amplifier A3 comes slightly positive to cause amplifier A3 to rapidly produce a negative output, the step change transition from the positive to the negative output being assured by the high gain of amplifier A3 and the level of this output being determined by the breakdown voltage of Zener D3.

The output of comparator 76 on conductor 80 is applied to integrator 82 via resistor R11, normally closed and sub-loop-operated loop-cutout switch S1, and a normally closed manually operated air/fuel preset switch S2, the purpose and operation of switches S1 and S2 being disclosed in further detail below in conjunction with loop cut-out circuit 84 and preset air fuel command circuit 86 respectively. Integrator 82 is of conventional design, here comprising an operational amplifier A4 the inverting input terminal of which is coupled to the output terminal T2 by a capacitor C4 and the noninverting input terminal of which is grounded. During normal operation of lean limit loop 12 switches S1 and S2 are both closed to communicate the output of comparator 74 to the integrator 82. Then, if the rectified roughness signal provided by full wave rectifier 74 is less than the roughness threshold reference provided by potentiometer 78, the resulting negative output of comparator 76 causes the output of integrator 82 to increase positively at a positive rate determined by the magnitudes of resistor R11 and capacitor C4. This output is coupled directly to air/fuel controller 60 and is suitably processed thereby to increase the air/fuel ratio by shortening the fuel injection period in a suitable manner similar to that as has been heretofore generally described. Conversely, if the rectified roughness signal is greater than the roughness threshold, the resulting positive input to integrator 82 causes the output thereof to decrease negatively at a negative rate to decrease the air/fuel ratio.

Even though the air/fuel ratio is normally controlled primarily by the output of the integrator 82, it may nevertheless be desirable to effect a predetermined air/fuel ratio during certain periods or conditions of operation. In the present embodiment, if comparator 76 were connected to integrator 82 with the engine 10 off, the air/fuel ratio might be rendered too lean to permit subsequent starting. Therefore, to provide a pre-set air/fuel ratio suitable for engine starting operations lean limit loop 12 further comprises an air/fuel pre-set circuit 86 that is operative to disconnect the input of integrator 82 from the output of comparator 76 and connect it instead to a known reference. A/F pre-set circuit 86 comprises the A/F pre-set switch S2 connected between S1 and the inverting input terminal of amplifier A4, voltage dividing resistors R12 and R14 connected in series between the output terminal T2 of amplifier A4 and a resistor R13 connected between a suitable negative supply and ground, and a conductor 88 connecting the node between resistors R11 and R12 to one contact of switch S2. With A/F pre-set switch S2 in the start-up position connecting conductor 88 to the inverting input terminal, the output of amplifier A4 is stabilized at a positive value reflective of the slightly negative voltage at the node between resistors R12 and R14. After the engine has been successfully started, A/F pre-set switch S2 is switched to the run position connecting the inverting input terminal to the output of comparator 76 instead of the A/F pre-set command circuit.

To open cutout switch S1 and thereby disable lean limit loop 12 when the magnitude of low frequency roughness signals exceeds a low frequency roughness threshold, the output of differentiator and filter 70 on conductor 72 is applied to a conventional low pass filter 90 comprising a resistor R15 in series with a capacitor C5, capacitor C5 also being connected in parallel with a resistor R16 between the inverting input terminal and the output terminal of an operational amplifier A5 to provide a unity gain therethrough.

The output of low pass filter 90 is applied on conductor 91 to the input of both a half wave rectifier stage 92' and the comparator stage 94'. As will be described more fully shortly, these stages cooperate to perform exactly the same functions as the full wave rectifier 74 and the comparator 76 of the primary lean limit loop 12 but provide better linearity between input and output signals of small magnitudes by eliminating diodes comparable to diodes D1 and D2 in the input path to amplifier A2 and thereby avoiding the attenuation otherwise introduced by the forward drop of such diodes. And this in turn is permitted by connecting the output of the low pass filter 90 to both the half wave rectifier stage 92' and the comparator stage 94' rather than to just the full wave rectifier stage 74 as in the case of the primary lean limit loop 12.

To obtain this result the output of low pass filter 90 is communicated by conductor 91 and resistors R17 and R18 respectively to the inverting input terminals of operational amplifiers A6 and A7, amplifiers A6 and A7 having their noninverting input terminals suitably grounded and comprising portions of the half wave rectifier stage 92' and the comparator stage 94' respectively. The output of amplifier A6 is connected to both the anode and the cathode respectively of diodes D5 and D6, the cathode and anode of which are respectively coupled to the inverting input terminal of amplifier A6 via resistors R20 and R21 respectively. With such connections, a positive output from low pass filter 90 causes a negative voltage at the output terminal of amplifier A6. This causes current to flow from the input to the output terminal of amplifier A6 through resistor R21 and diode D6 so that the resulting voltage at the node 95 between the anode of diode D6 and resistor R21 varies inversely with the product of the positive input voltage times the ratio of forward drop of diode D6 divided by the amplifier gain. On the other hand a negative output from low pass filter 90 back biases diode D6 so that it does not conduct with the result that the voltage at node 95 is virtually zero due to the feedback from the output to the input of the amplifier through diode D5 and resistor R20.

The voltage at node 95 is communicated to the inverting input terminal of amplifier A7 through a resistor R22 which, in the present application, is selected to have half the magnitude of resistor R18. With this relationship between the resistances of resistors R18 and R22, any negative voltage communicated from node 95 to the inverting input terminal of amplifier A7 is attenuated only half as much as a positive voltage communicated across resistor R18 from the output of low pass filter 90. Thus, considering just the inputs to amplifier A7 provided through resistors R18 and R22, the ratio therebetween causes a positive output of one volt from low pass filter 96 to result in a net negative input of one volt to amplifier A7 since the positive voltage created across resistor R18 is only half of the two volt negative potential created through resistor R22. To this extent, the positive output of low pass filter 90 is therefore at least half way rectified. Conversely, a negative output of 1 volt from low pass filter 90 also causes a negative input to amplifier A7, this negative input being created through resistor R18 alone since, as has been hereinabove been indicated, voltage at node 95 is virtually ground under these conditions. Moreover, to the extent that input to amplifier A7 is negative for both positive and negative outputs from low pass filter 90, such output is therefore fully rectified.

Also comprising a portion of comparator stage 92' is a suitable adjustable voltage reference in the form of a potentiometer 96, the fixed resistor R23 of which is connected between the suitable positive supply and ground and the wiper arm of which is connected to the inverting input terminal of amplifier A7 through a resistor R24. To activate relay circuit 98 and thereby cause cut-out switch S1 to open or cut out the main lean limit loop 12 when the low frequency roughness reference established by potentiometer 96 is exceeded by the full wave rectified output of low pass filter 90, the inverting input terminal of amplifier A7 is also connected by a forward polled Zener diode to the output thereof and therefrom through a resistor R25 to the base of an NPN transistor Q1 comprising a portion of the relay circuit 98. The collector of transistor Q1 is connected to one end of the coil L1 of the relay the contacts of which comprise the loop cut-out switch S1, the other end of coil L1 being connected to a suitable positive supply and also back to the collector of Q1 through a series field discharge circuit comprising a forward polled diode D8 and a resistor R26. When the net negative voltage resulting from the full wave rectification of the output of low pass filter 90 exceeds the low frequency roughness threshold established by potentiometer 96, the output of amplifier A7 instantaneously rises to the breakdown voltage of Zener diode D7 thereby forward biasing transistor Q1 into conduction to energize coil L1 and open switch S1. When the low frequency roughness thereafter subsides so that the net negative voltage resulting from the full wave rectification of the output of low pass filter 90 is less than the low frequency roughness threshold provided by potentiometer 96, the output of amplifier A7 instantaneously switches to virtual ground communicated thereto from the inverting input through the D7 feedback loop, thereby cutting off transistor Q1 and accordingly causing contacts S1 to return to their normally closed position.

The hereinabove described cut-out sub-loop 84 is operative to modify, by disabling, the normal operation of the lean limit loop 12 when the magnitude of those low frequency accelerations and decelerations ordinarily resulting from driver commanded changes in vehicle performance exceed a predetermined roughness magnitude determined by the low frequency roughness reference provided by potentiometer 96. In this manner the cut-out sub-loop 84 permits the lean limit loop 12 to normally control the air/fuel ratio only when the magnitude of just the higher frequency accelerations and decelerations exceed the predetermined roughness magnitude determined by potentiometer 78.

Figure 5:
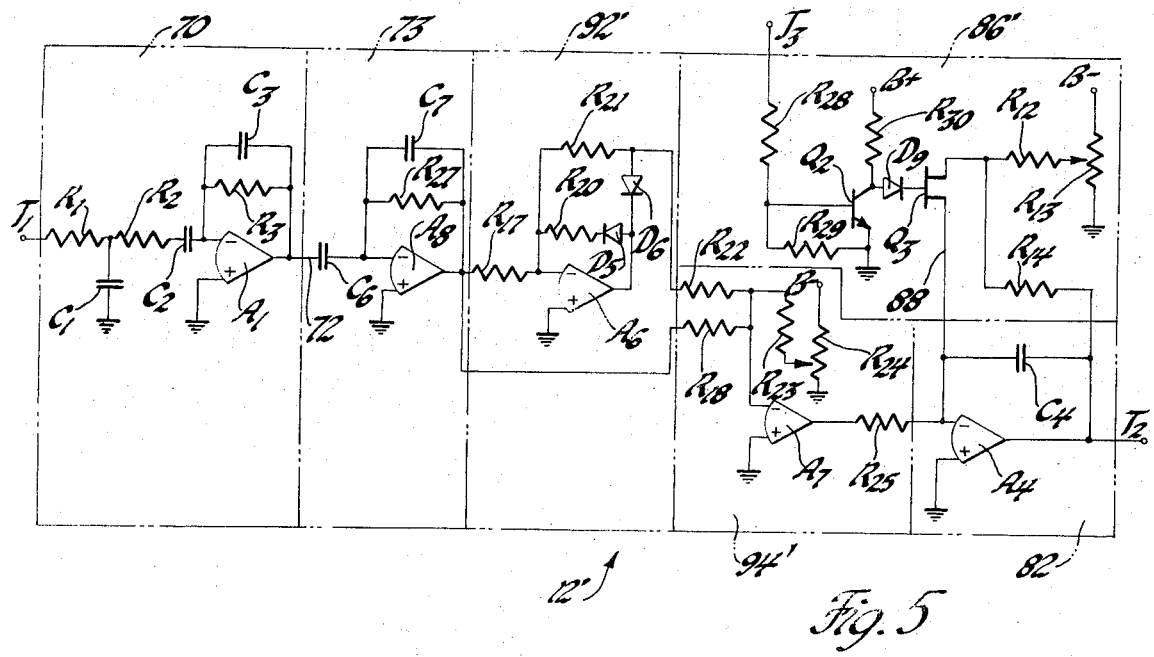
FIG. 5 is an electrical schematic of an alternative embodiment of the closed loop internal combustion engine control systems in FIGS. 3 and 4.

As may be better understood with reference to FIG. 5, the same result of limiting the normal operation of lean limit loop 12 to the presence of just higher frequency accelerations and decelerations is obtained by a more simple and efficient embodiment 12'. In this alternative embodiment 12', the entire cut-out sub-loop 84 illustrated in FIGS. 3 and 4 is replaced with just an additional differentiator and filter stage 73 inserted between the output of the first differentiator and filter stage 70 and the input of the full wave rectifier and comparator combination connected to integrator 82. The second differentiator and filter stage 73 provides an output varying with the second derivative of the speed signal applied to terminal T1 of the first differentiator and filter stage 70 and thereby permits the alternative lean limit loop 12' to anticipate the incipient roughness associated not only with large but slow engine accelerations and decelerations but also the roughness associated with small but fast changes in such accelerations and decelerations. Since the roughness signal provided by the rectifier and filter combination indicates the rate of change of acceleration and deceleration rather than just the rate of change of speed, it therefore is indicative of either those small changes in acceleration or deceleraion occurring very rapidly, or in this case at high frequencies, or those large accelerations and decelerations occurring at lower frequencies. Lean limit loop 12' is therefore substantially more sensitive, for comparable magnitude of acceleration and deceleration, to the roughness caused by the higher frequency components of the speed signal such as those related to momentary differences in the power generated by sequentially firing cylinders than by roughness caused by lower frequency components of the speed signal such as those related to driver commanded engine performance changes. Moreover, by appropriate selection of the resistors and capacitors comprising the first and second differentiator and filter stages 70 and 73, the lower frequency components of the second derivative signal produced by the second differentiator stage are even further attenuated with respect to the lower frequency components passed by the first differentiator stage 70 so as to be virtually eliminated.

To aid the understanding of the nature and operation of the units and components comprising lean limit loop 12' illustrated in FIG. 5, reference should be had to the hereinabove provided descriptions of similar units and components provided in conjunction with FIG. 4, such similar units and components being identically designated. Thus, the first differentiator and filter stage 70 filters and differentiates the speed signal provided at input terminal T1 and provides on conductor 72 a derivative signal varying with the first derivative of the speed signal. The output on conductor 72 is coupled by a capacitor C6 to the inverting input terminal of an operational amplifier A8 of the second differentiator and filter stage 73, the non-inverting input terminal of amplifier A8 being suitably grounded. The A8 output terminal is communicated back to the inverting input terminal by a filter circuit comprising capacitor C7 in parallel with resistor R27, the capacitor C6 and resistor R27 in combination with amplifier A8 also comprising a conventional differentiator having a lead type transfer function $\tau s$. The output of the second differentiator and filter stage 73 is applied through the input of the full wave rectifier and comparator combination which, while illustrated as comprising a half-wave rectifier stage 92' and comparator stage 94' similar to those illustrated and described hereinabove with respect to the cut-out sub-loop 84, could also comprise a full wave rectifier 74 and comparator 76 also illustrated and described hereinabove with reference to FIG. 4. Similarly, the air/fuel pre-set circuit 86' for initial conditioning the output of lean limit loop 12' performs substantially the same function as the air/fuel pre-set circuit 86 initial conditioning lean limit loop 12, circuit 86' just replacing the switch S2 in the input circuit to the inverting terminal of amplifier A4 of integrator 82 with an NPN transistor Q2 and a uni-junction transistor Q3. With the Q2 collector coupled to both a source of positive supply through a resistor R30 and to the Q3 base and with the Q2 emitter both suitably grounded and biased by a resistor R29 with respect to the Q2 base, a positive input command to the initialization terminal T3 is communicated to the Q2 base through a resistor R28 thereby switching on transistor Q2 and in turn uni-junction Q3. With uni-junction Q3 turned on, the voltage at the node between feedback resistor R14 and potentiometer wiper arm resistor R12 is coupled to the inverting input terminal of amplifier A4 to effect a predetermined positive output on terminal T2 such output effecting the desired pre-set air/fuel ratio.

Based on limited data obtained from tests of the lean limit loop 12 in the laboratory environment illustrated on FIG. 1, it was determined from steady state tests that good drivability could be maintained for air/fuel ratios as high as 19:1. In a standard constant volume sample (CVS) driving cycle, the lean limit loop 12 operated satisfactorily to maintain very good driveability while at the same time significantly reducing the mass emission of certain pollutants, hydrocarbons for example, from a baseline value of 3.732 grams per mile at a baseline air/fuel ratio of 14.5 without the loop operative to a value of 0.756 grams per mile with the loop operative to vary the air/fuel ratio from 14 to 20, such ratios being calculated from actual measurements of air flow and fuel flow and such emission values being obtained from samples collected and analyzed.

The following is a table of representative values and designations of components used that were used to construct and operate circuits of the type illustrated in FIGS. 4 and 5.

TABLE OF COMPONENT VALUES

| RESISTORS (Ohms) | | CAPACITORS (Farads) | |
|---|---|---|---|
| R1 | 12K | C1 | 4μ |
| R2 | 12K | C2 | 2μ |
| R3 | 500K | C3 | 0.1μ |
| Rp68p 4 | 10K | C4 | 10μ |
| R5 | 10K | C5 | 0.1μ |
| R6 | 10K | C6 | 2μ |
| R7 | 10K | C7 | 0.1μ |
| R8 | 10K | | |
| R10 | 5K | TRANSISTORS | |
| R11 | 1MEG. | | |
| R12 | 10K | Q1 | 2N3565 |
| R13 | 5K | Q2 | 2N3565 |
| R14 | 10K | Q3 | 2N5033 |
| R15 | 10K | | |
| R16 | 100K | | |
| R17 | 10K | | |
| R18 | 10K | DIODES | |
| R20 | 10K | D1 | 1N4001 |
| R21 | 10K | D2 | Do. |
| R22 | 5K | D3 | 2N5230-4.7v |
| R23 | 5K | D4 | Do. |
| R24 | 10K | D5 | 1N4001 |
| R25 | 10K | D6 | Do. |
| R26 | 360 | D7 | 2N5230-4.7v |
| R27 | 560K | D8 | 1N4001 |
| R28 | 5K | D9 | Do. |
| R29 | 1K | | |
| R30 | 1K | | |

Having described several embodiments of the invention, it is understood that the specific terms and examples are employed in a descriptive sense only and not for the purpose of limitation. Other embodiments of the invention, modifications thereof, and alternative thereto will be obvious to those skilled in the art may be made without departing from our invention. We therefore aim in the appended claims to cover the modifications and changes as are within the true scope and spirit of our invention.

What we claim is:

1. An engine control system for controlling an engine parameter of an internal combustion engine having a variable speed member the speed of which varies with the speed of the engine:
  a. speed sensing means operatively associated with said variable speed member for providing a speed signal varying with the speed thereof;
  b. speed signal differentiating means operatively connected in electrical circuit with said speed sensing means for providing a speed rate of change signal varying with a derivative of said speed signal;
  c. rectifier means operatively connected in electrical circuit with said speed signal differentiating means for rectifying said speed rate of change signal and providing a rectified roughness output signal;
  d. comparator means connected in electrical circuit with said rectifier means operative to provide a comparison signal having first and second magnitudes when said rectified roughness output signal is respectively above and below a predetermined magnitude;
  e. integrator means operatively connected with said comparator means operative to generate a control signal having a magnitude changing at a first predetermined rate when the magnitude of said comparison signal is one of said first and second magnitudes and at a second predetermined rate when the magnitude of said comparison signal is the other of said first and second magnitudes; and
  f. control means operatively connected with said integrator means and said engine responsive to control said engine parameter in accordance with said control signal.

2. The control system of claim 1, wherein said rectifier means comprises a full wave rectifier and wherein said first and second predetermined rates cause the magnitude of said control signal to respectively increase and decrease.

3. An engine control system for controlling an engine parameter of an internal combustion engine having a variable speed member the speed of which varies with the speed of the engine;
  a. speed sensing means operatively associated with said variable speed member for providing a speed signal varying with the speed thereof;
  b. speed signal differentiating means operatively connected in electrical circuit with said speed sensing means for providing a speed change signal varying with a derivative of said speed signal;
  c. comparator means connected in electrical circuit with said speed signal differentiating means operative to provide a comparison signal having first and second magnitudes when the magnitude of said speed change signal is respectively above and below a predetermined magnitude;
  d. integrator means operatively connected with said comparator means operative to generate a control signal increasing in magnitude when the magnitude of said comparison signal is one of said first and second magnitudes and decreasing the magnitude when the magnitude of said comparison signal is the other of said first and second magnitudes; and e. control means operatively connected with said integrator means and said engine responsive to control said engine parameter in accordance with said control signal.

4. An engine control system for controlling an engine parameter of an internal combustion engine having a variable speed member the speed of which varies with the speed of the engine:
 a. speed sensing means operatively associated with said variable speed member for providing a speed signal varying with the speed thereof;
 b. speed signal differentiating means operatively connected in electrical circuit with said speed sensing means for providing a speed rate of change signal varying with a derivative of said speed signal;
 c. rectifier means operatively connected in electrical circuit with said speed signal differentiating means for rectifying said speed rate of change signal and providing a roughness signal;
 d. integrator means operatively connected with said rectifier means for generating a control signal varying with an integral of said roughness signal; and
 e. control means operatively connected with said integrator means and said engine responsive to control said engine parameter in accordance with said control signal.

5. An air/fuel ratio control system for an internal combustion engine having controllable fuel delivery means and a rotatable member rotatable at speeds varying with the speed of the engine, said air/fuel ratio control system comprising:
 a. speed sensor means responsively connected to the engine to provide a speed signal varying with the speed of the rotatable member;
 b. differentiator means operatively connected to said speed sensor means for differentiating said speed signal and providing a roughness signal varying with a derivative of said speed signal;
 c. integrator means operatively connected to said differentiator means for integrating said roughness signal to provide a predetermined correction signal; and
 d. control means operatively connected to said integrator means and to said fuel delivery means for varying said air/fuel ratio by controlling said fuel delivery means in accordance with said predetermined correction signal.

6. An air/fuel ratio control system for controlling the mixture of air and fuel delivered to an internal combustion engine, the engine having air induction means for admitting an operator controllable air flow, fuel delivery means for delivering a controllable fuel flow to the air induction means in a controllable proportion to the air flow, and a rotatable member the momentary speed changes of which vary with the momentary speed changes of the engine to indicate the roughness of engine operation, said air/fuel control system comprising:

a. engine roughness sensing means responsively connected to the engine to sense momentary speed changes of the rotatable member and operative to provide a roughness signal having a magnitude varying with the sensed momentary speed changes; and
 b. fuel delivery control means operatively connecting the fuel delivery means and the said engine roughness sensing means for controlling the fuel delivery means so as to vary the fuel flow in a preselected relationship to the air flow so as to maintain the magnitude of said roughness signal at a predetermined magnitude.

7. An air/fuel ratio limit control system for limiting the leanness of an air/fuel mixture delivered to an internal combustion engine, the engine having air induction means for admitting an operator controllable air flow, fuel delivery means for delivering a controllable fuel flow to the air induction means, and a rotatable member the speed of which varies with the speed of the engine and the speed change of which varies with the roughness of the engine and also with the magnitude of the air/fuel mixture delivered thereto, said air/fuel ratio limit control system comprising:
 a. engine roughness sensing means responsive to the speed changes of the rotatable member to provide a roughness signal varying with the roughness of the engine; and
 b. fuel delivery control means operative to normally control the fuel delivery means so as to deliver the fuel flow in a known relation to the air flow when the roughness signal is less than a predetermined magnitude and to otherwise cooperate with the roughness sensing means to cause the fuel delivery means to increase the fuel flow in relation to the air flow when said roughness signal exceeds said predetermined magnitude, whereby the leanness of the air/fuel mixture delivered to the engine is controlled to maintain said roughness signal below said predetermined magnitude.

8. An air/fuel ratio control system for controlling an engine performance related parameter of an internal combustion engine, the engine performance related parameter exceeding a predetermined magnitude as the magnitude of the air/fuel ratio exceeds a predetermined ratio, the engine having air induction means for admitting an operator control-lable air flow, controllable fuel metering means for providing a fuel flow in a controllable ratio to the air flow, and a variable speed member the instantaneous speed changes of which vary with the magnitude of the engine performance related parameter, said air/fuel ratio control system comprising:
 a. speed change sensing means operatively coupled to said engine for providing a speed change signal varying in magnitude with the magnitude of said instantaneous speed changes of said variable speed member;
 b. control signal generation means for generating a speed change related control signal the magnitude of which increases as the magnitude of said speed change signal exceeds a predetermined magnitude; and
 c. fuel metering control means operatively connected to said fuel metering means and said control signal generation means responsive to said speed change related control signal to normally increase the air/fuel ratio towards said predetermined ratio when the magnitude of said engine performance related parameter is less than said predetermined magnitude and to otherwise reduce the air/fuel ratio when the magnitude of said engine performance related parameter exceeds said magnitude, whereby the magnitudes of said air/fuel ratio and said engine performance related parameter are continually varied at magnitudes less than said predetermined ratio and predetermined magnitude.

9. An air/fuel ratio control system for an internal combustion engine having a rotatable member rotatable at speeds varying with the speed of the engine, air induction means for admitting an operator controllable air flow, controllable fuel metering means for varying the fuel flow in a controllable proportion to the air flow in accordance with a speed signal and with a speed change related signal, and a rotatable member rotatable at speeds varying with the speed of the engine, said air/fuel ratio control system comprising:
   a. speed sensor means operatively connected to said control-lable fuel delivery means and to said rotatable member for generating said speed signal varying with the speed of the rotatable member;
   b. differentiator means operatively connected to said speed sensor means for differentiating said speed signal and providing a roughnes signal varying with a derivative of said speed signal; and
   c. signal generating means operatively connected with said differentiator means and said controllable fuel delivery means for generating said speed change related signal in accordance with a magnitude of said roughness signal, said speed change related control signal operative to cause said controllable fuel delivery means to increase the air/fuel ratio when said roughness signal is less than a predetermined roughness magnitude and to cause said controllable fuel delivery means to decrease the air/fuel ratio when said roughness signal is greater than said predetermined roughness magnitude.

10. An air/fuel ratio control system for an internal combustion engine having controllable fuel delivery means for varying the air/fuel ratio in accordance with a speed signal and the speed change related signal, a rotatable member rotatable at speeds varying with the speed of the engine, and speed sensor means responsively associated with said rotatable member for generating said speed signal for said controllable fuel delivery means, said speed signal having low frequency components indicative of low frequency driver commanded performance changes and higher frequency components varying with the magnitude of an engine performance related parameter, said air/fuel ratio control system comprising:
   a. differentiator means operatively connected to said speed sensor means for differentiating said speed signal and providing a roughness signal varying with a derivative of at least said higher frequency components of said speed signal;
   b. control means operatively connected to said differentiator means for generating said speed change related control signal in accordance with the magnitude of said roughness signal, said speed change related control signal causing said controllable fuel delivery means to increase said air/fuel ratio when said roughness signal is below a predetermined roughness magnitude and to decrease said air/fuel ratio when the magnitude of said roughness signal is above said predetermined roughness magnitude.

11. In the apparatus of claim 10, said derivative of said speed signal being the second derivative thereof whereby the magnitude of the resulting roughness signal varies with the magnitude of just said higher frequency components of the speed signal so that the speed change related signal does not cause the fuel delivery means to decrease the air/fuel ratio in the presence of said low frequency driver commanded performance changes.

12. In the apparatus of claim 10, said control means including frequency sensitive control override means responsive to said low frequency components to prevent said speed change related signals from causing said fuel delivery means to decrease the air/fuel ratio in the presence of said low frequency driver commanded performance changes.

13. An air/fuel ratio control system for an internal combustion engine having controllable fuel delivery means and a rotatable member rotatable at speeds varying with the speed of the engine, said air/fuel ratio control system comprising:
   a. speed sensor means responsively connected to the engine to provide the speed signal varying with the speed of the rotatable member, said speed signal having low and high frequency components;
   b. differentiator means operatively connected to said speed sensor means for differentiating said speed signal and providing a roughness signal varying with a derivative of said high frequency component of said speed signal;
   c. first control means operatively connecting said differentiator means and said controllable fuel delivery means causing said fuel delivery means to increase the air/fuel ratio when said roughness signal is less than a predetermined roughness magnitude, and to decrease said air/fuel ratio when the magnitude of said roughness signal is greater than said predetermined roughness magnitude; and
   d. second control means operatively connected between said first control means and said differentiator means for modifying said speed change related signal when the magnitude of said low frequency components exceeds a predetermined low frequency magnitude.

14. A roughness control system for controlling the roughness of an internal combustion engine, the engine having an operator controllable air fuel delivery means for delivering a controllable air fuel mixture and a rotatable member the momentary speed changes of which vary with the momentary speed changes of the engine to indicate the roughness of engine operation, said roughness control system comprising:
   a. engine roughness sensing means responsively connected to the engine for sensing momentary speed changes of the rotatable member and providing a roughness signal having a magnitude varying with the sensed momentary speed changes; and
   b. control means operatively connecting the air fuel delivery means and the said engine roughness sensing means for controlling the air fuel delivery means so as to regulate the magnitude of said roughness signal at a predetermined magnitude.

15. An air/fuel ratio control system for controlling the mixture of air and fuel delivered to an internal combustion engine, the engine having an operator controllable air fuel delivery means for delivering a variable ratio air fuel mixture and a rotatable member and momentary speed changes of which vary with the momentary speed changes of the engine to indicate the roughness of engine operation, said air/fuel control system comprising:

a. engine roughness sensing means responsively connected to the engine for sensing momentary speed changes of the rotatable member and providing a roughness signal having a magnitude varying with the sensed momentary speed changes; and b. control means operatively connecting the air fuel delivery means and the said engine roughness sensing means for controlling the fuel delivery means so as to normally bias the air fuel ratio in a lean direction until the magnitude of said roughness signal exceeds a predetermined magnitude and to thereafter decrease the air fuel ratio in a rich direction, whereby the air fuel delivery means regulates the magnitude of said roughness signal at said predetermined magnitude.

* * * * *

UNITED STATES PATENT OFFICE
CERTIFICATE OF CORRECTION

Patent No. 3,789,816                Dated February 5, 1974

Inventor(s) Lael B. Taplin, William R. Seitz and Chun Keung Leung

It is certified that error appears in the above-identified patent and that said Letters Patent are hereby corrected as shown below:

In column 1, line 41, the word should be "ineffectual" instead of "effectual".

In column 3, line 31, "as lean as" should be corrected to read "as lean an".

In column 7, line 22, the word should be "transmissions" instead of "transmission".

In column 9, line 30, after the word "described" insert as follows ---and described more specifically in commonly-assigned United States patent application 289,200 filed September 14, 1972 by William R. Seitz and entitled "Closed Loop Engine Control System," such application being expressly incorporated herein by reference.---

In column 10, line 42, before the word "drop" insert the word "voltage".

In column 12, line 17, "deceleraion" should read "deceleration".

In column 13, line 44, "Rp68p 4" should be "R4".

In column 16, line 43, Claim 8, change "control-lable" to ---controllable---.

In column 17, line 18, Claim 9, change "control-lable" to ---controllable---.

In column 18, line 67, Claim 15, change "member and" to ---member the---.

Signed and sealed this 16th day of July 1974.

(SEAL)
Attest:

McCOY M. GIBSON, JR.
Attesting Officer

C. MARSHALL DANN
Commissioner of Patents